June 26, 1962   P. L. LAYTON   3,041,218
GLASS FIBER REINFORCED BODIES
Filed Aug. 8, 1958
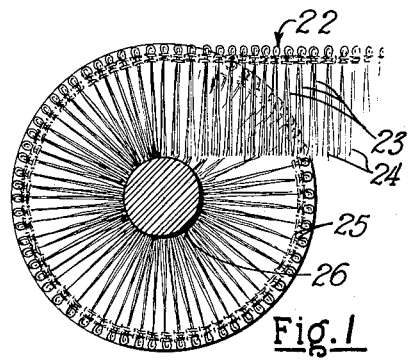
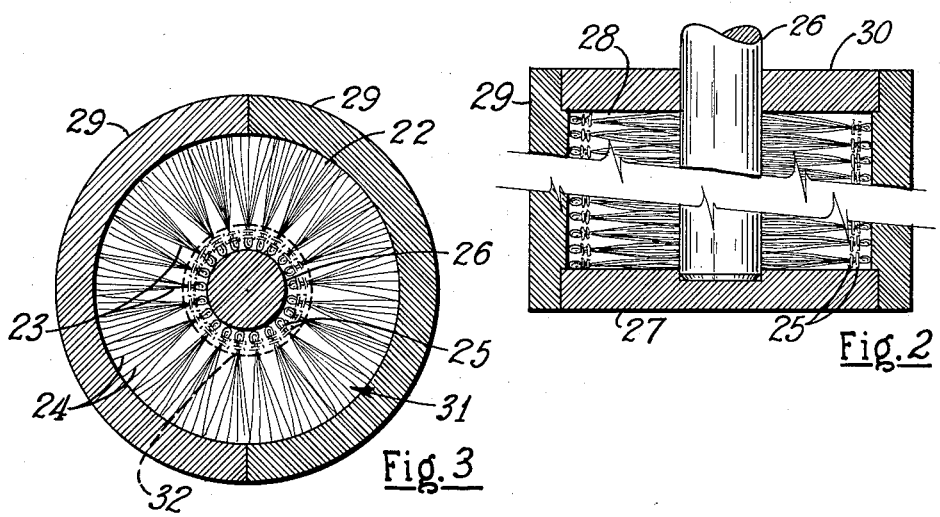
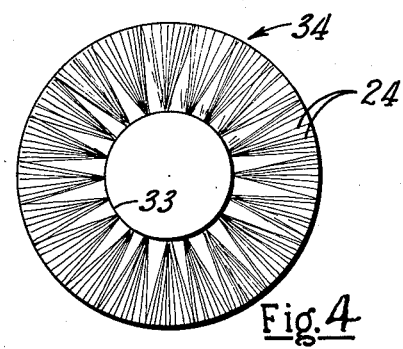
P. L. LAYTON
INVENTOR·
BY
ATTORNEYS

United States Patent Office 3,041,218
Patented June 26, 1962

3,041,218
GLASS FIBER REINFORCED BODIES
Paul L. Layton, La Canada, Calif., assignor to Owens-Corning Fiberglas Corporation, Toledo, Ohio, a corporation of Delaware
Filed Aug. 8, 1958, Ser. No. 754,104
2 Claims. (Cl. 154—43)

This invention relates to bodies of glass fiber reinforced plastic materials with fibers therein disposed laterally to a main surface of the bodies, which bodies are particularly effective for aerodynamic applications and other applications where resistance to erosion is an important quality.

Many of the problems of deterioration by high temperature, high velocity gases encountered with nose cones are applicable to nozzles for rockets and reaction engines in general. The present invention is useful in conjunction with these devices by reason of the increased erosion-resistant qualities of a reinforced plastic body resulting therefrom.

The present invention provides a body of glass fiber reinforced plastic material in which at least a large portion of the glass fibers extend at angles to the main surfaces of the body. In this manner, the ends of the fibers and not the length are exposed to destructive forces that tend to erode or wear the surfaces of the body and enable the body to resist such destructive forces for considerably longer periods of time. This construction also provides a stronger body which can maintain higher strength at high temperatures. Further, the new body minimizes the possibility of fibers being torn from the body when subjected to relatively concentrated forces such as high velocity raindrop impingement.

It is, therefore, a principal object of the invention to provide a body reinforced with glass fibers in which at least a large portion of the fibers are disposed laterally to the main surfaces of the body in predetermined positions.

Another object of the invention is to provide a body constructed of a glass fiber reinforced plastic material, which body has an improved resistance to wear and erosion.

A further object of the invention is to provide an improved aerodynamic body reinforced with glass fibers having higher resistance to the erosive effects of wind, rain, and high temperatures.

Other objects of the invention will be apparent from the following detailed description of a preferred embodiment thereof, reference being made to the accompanying drawing, in which:

FIG. 1 is a view in cross section of a portion of a rocket nozzle blank being fabricated of a plastic material reinforced with a glass fiber strip which is in the form of fringe, FIG. 2 is a view in vertical cross section of a rocket nozzle blank showing the glass fiber reinforced strip in lamellar form, with forming members which hold the shape of the blank as it cures, FIG. 3 is a view in horizontal cross section of a modified body reinforced with glass fiber fringe the free ends of which are disposed in the opposite direction to the fringe ends shown in the body in FIGS. 1 and 2, with a forming member therearound, and FIG. 4 is a view in cross section of the body shown in FIG. 3 after machining.

The term "fibers" as used herein is intended to be employed in a broad sense to include individual, continuous fibers more particularly known as filaments; groups of individual filaments, more particularly known as strands; groups of twisted strands, more particularly known as yarn or thread; untwisted or slightly twisted groups of strands, generally looped back on one another, more particularly known as roving; discontinuous lengths of fibers, more particularly known as staple fibers, which can be spun into threads, twisted strands, sliver, roving, or yarn; and short or chopped fibers generally less than an inch in length.

Rocket nozzles made in accordance with the principles of the invention can withstand higher temperatures and pressures for much longer periods of time than previously known nozzles in which the fibers are arranged parallel to the surface or in a random manner. Such a nozzle can be made with a resin and glass fiber strip wound in a helical manner. Another effective rocket nozzle can be made with a glass fiber reinforcing fringe 22 shown in FIG. 1. The fringe 22 includes groups or tufts 23 of U-shaped fibers 24 which extend laterally to a main surface of the body with free ends extending substantially to the main surface and with the opposite ends held by two rows 25 of fibers or threads stitched in a suitable pattern around the fibers 24. The fringe is wound around a mandrel 26, which is removably held in a lower plate 27, to a desired height to form an uncured body 28. The fringe 22 is impregnated with a suitable resin either before or while it is wound around the mandrel 26. A suitable segmented cylinder 29 can be placed around the newly formed body 28 and positioned on the lower plate 27. An upper plate 30 is then positioned around the mandrel 26 and on the cylinder 29 to slightly compress the body 28 and maintain pressure thereon when the assembly is placed in a suitable oven for curing the resin in the body 28. After curing, the upper plate 30, the cylinder 29, and the mandrel 26 are removed and the cured body can be machined to form a completed rocket nozzle or an insert therefor.

FIG. 3 shows a modified body 31 formed with the fringe 22 extending in the opposite direction, with the threads 25 near the core and the free ends of the fibers 24 extending to the outer surface of the body. This form is particularly useful where the outer surface of a finished body is subjected to destructive forces, rather than the core, because the free ends of the fibers are more uniformly disposed at the outer surface than they are toward the center where they are grouped in the tufts 23 and held by the threads 25. However, the core can be enlarged by machining out a portion defined by a dotted line 32 to form a surface 33 well beyond the threads 25, at which point the fibers 24 are also substantially uniformly distributed toward the surface 33. The machining is done only after the body 31 is cured so that the threads 25 will still be available during curing to properly hold the fibers 24 in place. After machining, a cured body 34 of FIG. 4 has both the inner and outer surfaces reinforced with uniformly disposed fibers so that a body of this type can be effectively used when destructive forces act on either the inner or outer peripheral surfaces.

From the above discussion, it will be seen that the invention basically comprises a body including a matrix reinforced with glass fibers disposed in predetermined positions which extend laterally to a main surface of the body.

Various modifications of the above described bodies and construction thereof will be apparent, particularly when such bodies are considered for uses other than those discussed above. Such modifications can be made without departing from the scope of the invention as defined in the appended claims.

What we claim is:

1. A nozzle component for a rocket or the like, said component comprising an elongate body having a main surface which defines a large, central, generally cylindrical passage, said body consisting essentially of a resinous material reinforced with glass fibers substantially all of which extend generally radially outwardly from an end which is at least substantially in the main surface.

2. A generally cylindrical body having a main surface which is resistant to destruction when exposed to fluid moving in a high velocity stream, said body comprising a hardened matrix reinforced with a plurality of inorganic fibers, each of which has an end which is at least substantially in the major surface, and extends through the body from such end generally perpendicular to such surface to a second end, the second ends of the fibers being positioned along the surface of a helix, and means within the body in addition to said hardened matrix effective to limit the movement of the second end of each of said fibers relative to the second ends of other fibers.

References Cited in the file of this patent

UNITED STATES PATENTS

| | | |
|---|---|---|
| 1,180,503 | Kelley | Apr. 25, 1916 |
| 1,346,612 | Stokes | July 13, 1920 |
| 1,475,764 | Frederick | Nov. 27, 1923 |
| 1,601,911 | Godfrey | Oct. 5, 1926 |
| 1,638,012 | Hoof | Aug. 9, 1927 |
| 2,393,100 | Gallay et al. | Jan. 15, 1946 |
| 2,428,591 | Slayter | Oct. 7, 1947 |
| 2,428,654 | Collins | Oct. 7, 1947 |
| 2,438,156 | Dodge | Mar. 23, 1948 |
| 2,564,695 | Johnson et al. | Aug. 21, 1951 |
| 2,698,504 | Lotz | Jan. 4, 1955 |
| 2,734,785 | Toulmin | Feb. 14, 1956 |
| 2,763,105 | Feeley | Sept. 18, 1956 |

OTHER REFERENCES

"Fiberglas-Reinforced Plastic as a Rocket Structural Material," Miller et al., Jet Propulsion, November 1956, vol. 26, No. 11, pages 969–972, published by the American Rocket Society, New York, N.Y.